United States Patent Office 3,177,220
Patented Apr. 6, 1965

3,177,220
CERTAIN 2H-2-TRICHLOROMETHYLMERCAPTO-NAPHTH[1,8 - cd]ISOTHIAZOLE - 1,1 - DIOXIDE COMPOUNDS
Gérald Rey-Bellet and Hans Spiegelberg, Basel, Switzerland, assignors to Hoffmann-La Roche Inc., Nutley, N.J., a corporation of New Jersey
No Drawing. Filed Sept. 17, 1962, Ser. No. 224,249
Claims priority, application Switzerland, Sept. 26, 1961, 11,159/61
3 Claims. (Cl. 260—301)

This invention relates, in general, to novel naphthalene compounds and to a process for producing same. More particularly, it relates to naphthalene compounds having the formula:

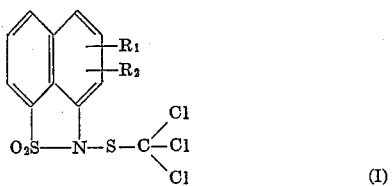

in which $R_1$ represents hydrogen or a halogen atom, or a nitro, alkyl or acyl group; and in which $R_2$ represents hydrogen or a halogen atom or a nitro, alkyl or acyl group.

In the practice of the present invention, a compound having the formula:

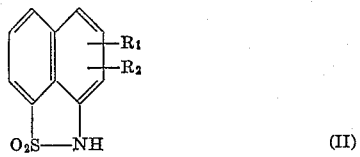

in which $R_1$ and $R_2$ have the same means as set forth heretofore in connection with Formula I or a metal salt of such a compound, is reacted with trichloromethylsulphur chloride.

In carrying out this invention, one may use, as the starting material, a compound of Formula II which is unsubstituted in the naphthalene nucleus. Additionally, however, the invention may be carried out using a naphthalene compound of Formula II, the aromatic nucleus of which is substituted, for example, with halogen atoms, such as chlorine, bromine, etc.; nitro groups; lower aliphatic acyl groups, such as acetyl, formyl, etc.; or lower alkyl groups, such as methyl, ethyl, etc.

The reaction of the compound of Formula II with trichloromethylsulphur chloride can, for example, be carried out in the following manner. The substituted or unsubstituted 2H-naphth[1,8-cd]isothiazole-1,1-dioxide in the form of an alkali metal salt, for example, the sodium salt, is reacted with trichloromethylsulphur chloride, preferably, employing approximately stoichiometrically equivalent quantities of the reactants. The reaction takes place suitably in the presence of a solvent, such as benzene, toluene, carbon tetrachloride or nitrobenzene, preferably, while the reaction mixture is heated at a temperature within the range of from about 50° C. to 130° C.

In another embodiment of the invention, the compound of Formula II is dissolved in an aqueous solution containing a stoichiometrically equivalent quantity of an alkali metal hydroxide. The aqueous solution of the alkali metal salt, thus obtained, is subsequently reacted with trichloromethylsulphur chloride. The trichloromethylsulphur chloride reactant is added, suitably, in a dropwise fashion, at a temperature at or near room temperature. As the reaction progresses, the desired substituted naphthalene compound gradually begins to separate out.

The process of the present invention can also be carried out by reacting a compound of Formula II with trichloromethylsulphur chloride in the presence of an acid-binding agent. As the acid-binding agent, one may use sodium carbonate, potassium carbonate, pyridine, triethylamine, etc.

The 2H - naphth[1,8-cd]isothiazole-1,1-dioxide compounds which are obtained in the practice of the present invention are useful as fungicides and as fungistatic agents. These compounds have utility, for example, in the treatment of infections caused by the organisms Botrytis and Venturia.

For a fuller understanding of the nature and objects of this invention, reference may be had to the following examples which are given merely as further illustrations of the invention and are not to be construed in a limiting sense.

Example 1

In this example, 2.3 grams of sodium were dissolved in 100 ml. of absolute ethanol. To this solution there was added 20.5 grams of 2H-naphth[1,8-cd]isothiazole-1,1-dioxide. A clear solution formed and this solution was subsequently evaporated to dryness under reduced pressure. The solid residue, remaining after the solvent had been removed, was suspended in 100 ml. of dry benzene and to this suspension there was added, drop by drop, with stirring, over a period of about one hour, 18.9 grams of trichloromethylsulphur chloride. During the addition of the latter compound, the reaction mixture was heated slowly so that when the addition of the trichloromethylsulphur chloride was complete the boiling point of the reaction mixture had been reached. Thereafter, the mixture was heated at reflux for an additional five hours. At the end of this time, the solution was filtered while still warm. On cooling, 2H-2-trichloromethylmercapto-naphth[1,8-cd]isothiazole-1,7-dioxide separated from the filtrate in the form of crystals. This product, after recrystallization from benzene, melted at 167° C. to 168° C.

Example 2

In this example, 12.4 grams of 2H-5-acetyl-naphth[1,8-cd]isothiazole-1,1-dioxide were added to a solution of 2.0 grams of sodium hydroxide in 200 ml. of water. Thereafter, 9.3 grams of trichloromethylsulphur chloride were added, drop by drop, to the clear solution, thus obtained. The condensation product precipitated out when the solution was warmed slightly. After stirring for a period of about 10 hours at room temperature, the reaction mixture was filtered with suction to recover the precipitate which formed. The precipitate was then washed with water. The precipitate was subsequently dissolved in methylene chloride and this solution was shaken with dilute caustic soda, washed with water until neutral, dried over sodium sulfate and evaporated. The residue was recrystallized from benzene to yield 2H-2-trichloromethylmercapto-5-acetyl-naphth[1,8-cd]isothiazole-1,1-dioxide as a yellow-colored crystalline powder having a melting point of 154° C. to 155° C.

Example 3

In this example, 5.25 grams of 2H-naphth[1,8-cd]isothiazole-1,1-dioxide was added to a solution of 1.0 gram of sodium hydroxide in 50 ml. of water. Thereafter, 4.65 grams of trichloromethylsulphur chloride was added to the clear solution, thus obtained. The temperature of the reaction mixture rose to about 35° C. and the condensation product, which was produced, began to precipitate slowly out of the reaction mixture. The reaction mixture was stirred for an additional period of three hours, following which it was filtered with suction, dried and recrystallized from benzene. The product, thus obtained, namely 2H-2-trichloromethylmercapto-naphth[1,8-cd]isothiazole-1,1-dioxide, after recrystallization from benzene, melted at 167° C. to 168° C.

*Example 4*

To a solution of 11.5 grams of sodium in 1000 ml. of ethanol, there was added 102.5 grams of 2H-naphth[1,8-cd]isothiazole-1,1-dioxide. The clear solution, thus obtained, was stirred for an hour at a temperature of 20° C. to 25° C. and then it was reacted in a dropwise fashion, over a period of one hour, with 93.0 grams of trichloromethylsulphur chloride. The mixture was heated for two hours at reflux, cooled, filtered and concentrated by evaporation. The residue was taken up in a methylene chloride-water mixture and the methylene chloride solution was washed with water, dried over sodium sulfate and concentrated under reduced pressure. Recrystallization of the product from ethyl acetate-petroleum ether yielded 2H-2-trichloromethylmercapto-naphth[1,8-cd]isothiazole-1,1-dioxide melting at 167° C. to 168° C.

We claim:
1. A compound of the formula

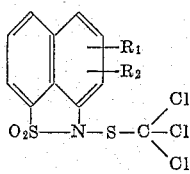

in which $R_1$ is a member selected from the group consisting of hydrogen, halogen, nitro, lower alkyl, formyl and acetyl; and in which $R_2$ is a member selected from the group consisting of hydrogen, halogen, nitro, lower alkyl, formyl and acetyl.

2. 2H - 2-trichloromethylmercapto-naphth[1,8-cd]isothiazole-1,1-dioxide.

3. 2H - 2-trichloromethylmercapto-5-acetyl-naphth[1,8-cd]isothiazole-1,1-dioxide.

References Cited by the Examiner

UNITED STATES PATENTS

| | | | |
|---|---|---|---|
| 2,553,770 | 5/51 | Kittleson | 260—301 |
| 2,856,410 | 10/58 | Kittleson et al. | 260—301 |
| 3,068,190 | 12/62 | D'Alelio | 167—33 |

OTHER REFERENCES

Bambas: Heterocyclic Compounds (New York, 1952), pages 354–367.

IRVING MARCUS, *Primary Examiner.*

NICHOLAS S. RIZZO, WALTER A. MODANCE,
*Examiners.*

UNITED STATES PATENT OFFICE

CERTIFICATE OF CORRECTION

Patent No. 3,177,220　　　　　　　　　　　　April 6, 1965

Gérald Rey-Bellet et al.

It is hereby certified that error appears in the above numbered patent requiring correction and that the said Letters Patent should read as corrected below.

Column 2, line 36, for "-1,7-dioxide" read -- -1,1-dioxide --.

Signed and sealed this 24th day of August 1965.

(SEAL)
Attest:

ERNEST W. SWIDER
Attesting Officer

EDWARD J. BRENNER
Commissioner of Patents